United States Patent
Kutsumi

(10) Patent No.: US 6,385,569 B1
(45) Date of Patent: May 7, 2002

(54) TRANSLATOR, TRANSLATING METHOD AND RECORDING MEDIUM HAVING TRANSLATING PROGRAM RECORDED THEREON

(75) Inventor: Takeshi Kutsumi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/523,290

(22) Filed: Mar. 10, 2000

(30) Foreign Application Priority Data

Mar. 11, 1999 (JP) .............................. 11-065445

(51) Int. Cl.⁷ ............................................... G06F 17/28
(52) U.S. Cl. ................................................ 704/7; 704/2
(58) Field of Search ............................ 704/2, 3, 4–7, 704/9; 707/530, 532

(56) References Cited

U.S. PATENT DOCUMENTS

| | | | | |
|---|---|---|---|---|
| 4,775,956 A | * | 10/1988 | Kaji et al. ...................... | 707/7 |
| 5,010,486 A | * | 4/1991 | Suzuki et al. ................... | 704/7 |
| 5,029,084 A | * | 7/1991 | Morahasi et al. ............... | 704/2 |
| 5,075,851 A | * | 12/1991 | Kugimiya et al. .............. | 704/2 |
| 5,225,981 A | * | 7/1993 | Yokogawa ...................... | 704/2 |
| 5,490,061 A | * | 2/1996 | Tolin et al. ..................... | 704/2 |
| 5,559,693 A | * | 9/1996 | Anick et al. ................... | 704/9 |
| 5,873,055 A | * | 2/1999 | Okunishi ........................ | 704/2 |
| 6,073,146 A | * | 6/2000 | Chen ............................. | 704/3 |

FOREIGN PATENT DOCUMENTS

| | | | | |
|---|---|---|---|---|
| JP | 63109572 | | 5/1988 | ............ G06F/15/38 |
| JP | 01265359 | * | 10/1989 | ............ G06F/15/38 |
| JP | 05165805 | * | 7/1993 | ............ F06F/15/20 |
| JP | 06295311 | * | 10/1994 | ............ G06F/15/38 |
| JP | 08329081 | * | 12/1996 | ............ G06F/17/27 |
| JP | 09146951 | * | 6/1997 | ............ G06F/17/28 |

* cited by examiner

Primary Examiner—Patrick N. Edouard
(74) Attorney, Agent, or Firm—Nioxn & Vanderhye, P.C.

(57) ABSTRACT

A translator includes a word dictionary, an affix dictionary, an input section for inputting an original language to be a first language, a converting section for referring to the word dictionary, thereby converting the input original language into a translated word to be a second language, a recognizing section for referring to the word dictionary and the affix dictionary, thereby recognizing a derivative having an affix and a word base from the input original language which cannot be converted into the translated word by the converting section, a derivative translation generating section for linking a translated word corresponding to the affix of the recognized derivative to a translated word corresponding to the word base, thereby generating a translated word of one derivative, and an affix determining section for determining one affix based on an affix processing condition given from a language characteristic information when a derivative including a plurality of affixes is recognized by the recognizing section, wherein the derivative translation generating section generates a translated word of a derivative having the affix determined by the affix determining section and a word base corresponding thereto.

10 Claims, 28 Drawing Sheets

FIG. 11

PREFIX TABLE

| ID | PREFIX | TRANSLATED WORD | GENERATION PATTERN TABLE |
|---|---|---|---|
| 1 | ex | 前 | |
| 2 | non | 非 | 101 |
| 3 | un | 不 | 102 |

FIG. 12

SUFFIX TABLE

| ID | SUFFIX | PART OF SPEECH | TRANSLATED WORD | LINK CONDITION | GENERATION PATTERN TABLE |
|---|---|---|---|---|---|
| 1 | able | ADJECTIVE | ことが可能な | LINKING AFTER THE REMOVAL OF "e" ON THE END OF A WORD BASE | 201 |
| 2 | ive | ADJECTIVE | | | 202 |
| 3 | ed | ADJECTIVE | された | LINKING AFTER THE REMOVAL OF "e" ON THE END OF A WORD BASE<br>LINKING AFTER REPEATING A CONSONANT CHARACTER ON THE END OF THE WORD BASE | |
| 4 | er | NOUN | もの | LINKING AFTER THE REMOVAL OF "e" ON THE END OF A WORD BASE<br>LINKING AFTER REPEATING A CONSONANT CHARACTER ON THE END OF THE WORD BASE | |
| 5 | ness | NOUN | こと | | 203 |

FIG. 13

PREFIX (non) PROCESSING PATTERN 101

| ID | CONDITION | PROCESSING |
|---|---|---|
| 1 | NOUN + "OF (の)" | "NON(非)" + TRANSLATED WORD OF WORD BASE |
| 2 | ADJECTIVAL VERB "的な" | "NON(非)" + TRANSLATED WORD OF WORD BASE |
| 3 | ADJECTIVAL VERB (EXCEPT "的な") | CONTINUOUS FORM OF TRANSLATED WORD OF WORD BASE + "THERE IS NOT (ない)" |
| 4 | ADJECTIVE | CONTINUOUS FORM OF TRANSLATED WORD OF WORD BASE + "THERE IS NOT (ない)" |
| 5 | CASE POSTPOSITION + "THERE IS (ある)" | SUBSTITUTE "THERE IS NOT (ない)" FOR "THERE IS (ある)" |
| 6 | VERB + "PAST FORM (た)" | SUBSTITUTE "PRESENT FORM (て)" FOR "PAST FORM (た)" |

FIG. 14

SUFFIX (ness) PROCESSING PATTERN 203

| ID | CONDITION | PROCESSING |
|----|-----------|------------|
| 1 | "{CASE POSTPOSION(が\|の)}" + ADJECTIVE (EXCEPT "THERE IS ") | "OF(の)" + STEM OF ADJECTIVE + "さ" |
| 2 | AJECTIVE (EXCEPT "THERE IS") | STEM OF ADJECTIVE + "さ" |
| 3 | "{AJECTIVE (的な\|的)}" | SUBSTITUTE "{的な\|的}" FOR "性" |
| 4 | "{CASE POSTPOSION(が\|の)}}CAN" | "POSSIBLE (の可能性)" |
| 5 | "{CASE POSTPOSION(が\|の)}" + ADJECTIVAL VERB (EXCEPT "CAN""AND""LIKE ") | "OF(の)" + STEM OF ADJECTIVE + "さ" |
| 6 | "CAN (可能な)" | "POSSIBILITY (可能性)" |
| 7 | ADJECTIVE VERB (EXCEPT "CAN""AND""LIKE") | STEM OF ADJECTIVE + "さ" |
| 8 | {NOUN\|STEM OF 'SAHEN' VERB} + "{CAN\|CAPABLE}" | SUBSTITUTE "POSSIBILITY (可能性)" FOR "{CAN\|CAPABLE}" |
| 9 | "TO (に)" + 'SAHEN' VERB | TRANSLATED WORD OF WORD BASE + "MATTER(こと)" |
| 10 | 'SAHEN' VERB (EXCEPT THE FOREGOING) | STEM OF 'SAHEN' |

FIG. 15

WORD DICTIONARY TABLE

| HEADING | PART OF SPEECH | TRANSLATED WORD | PART OF SPEECH OF TRANSLATED WORD | CHANGE FORM ||||
|---|---|---|---|---|---|---|---|
| | | | | THIRD PERSON SINGULAR PRESENT FORM | PRESENT PROGRESSIVE FORM | PAST FORM | PAST PARTICIPLE FORM |
| abiding | ADJECTIVE | 永続的な | ADJECTIVAL VERB | | | | |
| amiable | ADJECTIVE | 感じがよい | NOUN+CASE POSTPOSITION +ADJECTIVE | | | | |
| clear | VERB | クリアする | VERB (SAHEN) | REGULAR | REGULAR | REGULAR | REGULAR |
| clear | ADJECTIVE | 明瞭な | ADJECTIVAL VERB | | | | |
| export | VERB | 輸出する | VERB (SAHEN) | REGULAR | REGULAR | REGULAR | REGULAR |
| not | NEGATIVE | | | | | | |
| note | VERB | 注目する | VERB | REGULAR | noting | noted | noted |
| portable | ADJECTIVE | 携帯用の | NOUN+CASE POSTPOSITION | | | | |
| redioactive | ADJECTIVE | 放射性の | NOUN+CASE POSTPOSITION | | | | |
| remunerative | ADJECTIVE | 利益がある | NOUN+CASE POSTPOSITION +VERB (FIVE CONJUGATIONS) | | | | |
| unclear | ADJECTIVE | はっきりしない | ADJECTIVE | | | | |

FIG. 16

VERB REGULAR CHANGE FORM TABLE

| PART OF SPEECH | TENSE OR THE LIKE | FORM |
|---|---|---|
| VERB | THIRD PERSON SINGULAR PRESENT FORM | s |
| | PRESENT PROGRESSIVE FORM | ing |
| | PAST FORM | ed |
| | PAST PARTICIPLE FORM | ed |

FIG. 17

MATCH PREFIX BUFFER

| ID | PREFIX | WORD BASE POINTER |
|---|---|---|
| 1 | ex | 1 |

FIG. 18

MATCH SUFFIX BUFFER

| ID | SUFFIX | WORD BASE POINTER |
|---|---|---|
| 1 | able | 2,3 |

FIG. 19

WORD BASE BUFFER

| ID | WORD BASE |
|----|-----------|
| 1  | portable  |
| 2  | export    |
| 3  | exporte   |

FIG. 20

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|----|---------|-------------------|----------------|-------------|-----------------|-----------------------------------|
| 1  | export  |                   | VERB           |             | 輸出する         | VERB                              |

FIG. 21

DICTIONARY RETRIEVAL BUFFER

| POSITION OF WORD | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | exportable | | ADJECTIVE | | 輸出可能な | ADJECTIVE |

FIG. 22

MATCH PREFIX BUFFER

| ID | PREFIX | WORD BASE POINTER |
|----|--------|-------------------|
| 1  | un     | 1                 |

FIG. 23

MATCH SUFFIX BUFFER

| ID | SUFFIX | WORD BASE POINTER |
|----|--------|-------------------|
| 1  | ed     | 2                 |

FIG. 24

WORD BASE BUFFER

| ID | WORD BASE |
|----|-----------|
| 1  | cleared   |
| 2  | unclear   |

FIG. 25

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | clear | | VERB | PAST FORM, PAST PARTICLE FORM | クリアする | VERB (SAHEN) |

FIG. 26

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | unclear | | VERB | PAST FORM, PAST PARTICLE FORM | クリアしない | VERB (SAHEN) + AUXILIARY VERB |

FIG. 27

MATCH PREFIX BUFFER

| ID | PREFIX | WORD BASE POINTER |
|---|---|---|
| 1 | non | 1 |

FIG. 28

MATCH SUFFIX BUFFER

| ID | SUFFIX | WORD BASE POINTER |
|----|--------|-------------------|
| 1  | ive    | 2                 |

FIG. 29

WORD BASE BUFFER

| ID | WORD BASE   |
|----|-------------|
| 1  | radioactive |
| 2  | nonradioact |

FIG. 30

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|----|---------|-------------------|----------------|-------------|-----------------|-----------------------------------|
| 1  | nonradioact | ○ | | | | |

FIG. 31

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | radioactive | | ADJECTIVE | | 放射性の | NOUN + CASE POSTPOSITION |

FIG. 32

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | nonradioactive | | ADJECTIVE | | 非放射性の | NOUN + CASE POSTPOSITION |

FIG. 33

MATCH SUFFIX BUFFER

| ID | SUFFIX | WORD BASE POINTER |
|---|---|---|
| 1 | er | 1,2 |

FIG. 34

WORD BASE BUFFER

| ID | WORD BASE |
|---|---|
| 1 | not |
| 2 | note |

FIG. 35

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|----|---------|-------------------|----------------|-------------|-----------------|-----------------------------------|
| 1  | not     |                   | NEGATIVE       |             |                 |                                   |
| 2  | note    |                   | VERB           |             | 注目する         | VERB (SAHEN)                      |

FIG. 36

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|----|---------|-------------------|----------------|-------------|-----------------|-----------------------------------|
| 1  | note    |                   | VERB           |             | 注目する         | VERB (SAHEN)                      |

FIG. 37

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|----|---------|-------------------|----------------|-------------|-----------------|-----------------------------------|
| 1  | noter   |                   | NOUN           |             | 注目するもの     | VERB (SAHEN) + NOUN               |

FIG. 38

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|----|---------|-------------------|----------------|-------------|-----------------|-----------------------------------|
| 1 | remunerative | | ADJECTIVE | | 利益がある | NOUN+CASE POSTPOSITION +VERB(FIVE CONJUGATIONS) |

FIG. 39

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | nonremunerative | | ADJECTIVE | | 利益がない | NOUN+CASE POSTPOSITION +ADJECTIVE |

FIG. 40

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | amiable | | ADJECTIVE | | 感じがよい | NOUN+CASE POSTPOSITION +ADJECTIVE |

FIG. 41

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | amiableness | | NOUN | | 感じのよさ | NOUN+CASE POSTPOSITION +NOUN |

FIG. 42

WORD BASE DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | abiding | | ADJECTIVE | | 永続的な | ADJECTIVAL VERB |

FIG. 43

DICTIONARY RETRIEVAL BUFFER

| ID | HEADING | UNKNOWN WORD FLAG | PART OF SPEECH | CHANGE FORM | TRANSLATED WORD | PART OF SPEECH OF TRANSLATED WORD |
|---|---|---|---|---|---|---|
| 1 | abidingness | | NOUN | | 永続性 | NOUN |

TRANSLATOR, TRANSLATING METHOD AND RECORDING MEDIUM HAVING TRANSLATING PROGRAM RECORDED THEREON

CROSS-REFERENCE TO RELATED APPLICATION

This application is related to Japanese Patent Application No. Hei 11(1999)-065445 filed on Mar. 11, 1999, whose priority is claimed under 35 USC § 119, the disclosure of which is incorporated by reference in its entirety.

BACKGROUND OF THE INVENTION

1. Field of the Invention

The present invention relates to a translator, a translating method and a recording medium having a translating program recorded thereon which serve to extract a derivative including a prefix and a suffix and a word base that has not been registered in a word dictionary, thereby generating a translated word.

2. Description of the Related Art

In recent years, a translator such as an English-to-Japanese translator has been increasingly required and has been variously developed. In a conventional translator, for example, a source language (an original language) is input to storage means through input means-such as a keyboard and the input source language is translated into a target language (an object language) through translating means by utilizing a table in which a word dictionary, syntax rules and tree structure conversion rules are stored.

In this case, the original language which has not been registered in the word dictionary is usually processed as an unknown word. Therefore, it has been necessary to translate the unknown word by referring to other dictionaries and the like later.

However, the unknown word includes a derivative having a prefix or a suffix added to a known word (word base), and the word base constituting the derivative is registered in the word dictionary. If the prefix or the suffix included in the derivative can be analyzed, the meaning of the derivative can also be presumed based on the meaning of the word base and that of the prefix or the suffix.

For example, Japanese Unexamined Patent Publication No. Sho 63(1988)-109572 has proposed a derivative processing method in which a word dictionary and an affix dictionary are provided, it is decided whether or not an unknown word detected in an input text is a derivative obtained by linking a prefix or a suffix to a known word, and grammatical properties having a grammar information for generating an object (a translated word), semantic properties, translated words or the like for the unknown word recognized as the derivative are particularly presumed according to the conditions, resulting in an enhancement in the certainty of the results of analysis and translation.

However, the derivative processing method described in the above-mentioned Japanese Unexamined Patent Publication No. Sho 63(1988)-109572 has a problem in that a proper translated word cannot be obtained depending on the structure of the derivative as will be described below.

(1) A derivative including a plurality of affixes has no function of accurately extracting the affix. Therefore, when a word of "exportable" is translated, for example, it might be recognized as a derivative having a prefix of "ex" and a known word of "portable" and might be translated by mistake".

However, the English word of "exportable" should be recognized as a derivative having a known word of "export" and a suffix of "able".

(2) In the case where the notation of a word base includes a part of the notation of a suffix, there is no function of accurately extracting the word base. Therefore, when a word of "noter" is translated, it might be recognized as a derivative having a word of "not" and a suffix of "er" However, the English word of "noter" should be recognized as a derivative having a known word of "note" and a suffix of "er".

(3) The translated word of the suffix is uniformly registered. Therefore, if the translated word of a prefix of "non" is determined as "非", for example, an English word of "nonremunerative" is recognized as a derivative having a prefix of "non (非)" and a known word of "remunerative (利益がある)" and a translated word thereof is defined as "非利益がある" obtained by linking the translated word of "non (非)". This translated word is unnatural as Japanese.

Based on the translation form of a word base, the translated word of "non" is obtained by replacing "there is (ある)" with "there is not (ない)". Consequently, the English word of "nonremunerative" should be translated as "利益がない" to obtain a natural Japanese translated word.

SUMMARY OF THE INVENTION

In consideration of the above-mentioned circumstances, it is an object of the present invention to provide a translator, a translating method and a recording medium having a translating program recorded thereon in which when a derivative having a plurality of combinations of an affix and a word base is recognized from an input original language that has not been registered in a word dictionary, an accurate derivative having an original affix and word base can be extracted to generate a natural translated word.

The present invention provides a translator comprising a word dictionary, an affix dictionary, an input section for inputting an original language to be a first language, a converting section for referring to the word dictionary, thereby converting the input original language into a translated word to be a second language, a recognizing section for referring to the word dictionary and the affix dictionary, thereby recognizing a derivative having an affix and a word base from the input original language which cannot be converted into the translated word by the converting section, a derivative translation generating section for linking a translated word corresponding to the affix of the recognized derivative to a translated word corresponding to the word base, thereby generating a translated word of one derivative, and an affix determining section for determining one affix based on an affix processing condition given from a language characteristic information when a derivative including a plurality of affixes is recognized by the recognizing section, wherein the derivative translation generating section generates a translated word of a derivative having the affix determined by the affix determining section and a word base corresponding thereto.

According to the present invention, there is provided the means for determining an affix based on the affix processing conditions given from the language characteristic information of a source language. Consequently, even if a derivative has a plurality of combinations of an affix and a word base for an input text which has not been registered in the word dictionary, an optimal affix can be determined and an accurate derivative can be recognized based on a word base corresponding to the optimal affix. Thus, a natural translated word can be generated.

According to the present invention, an affix is determined based on the language characteristic information of a source language when an unknown word in a text is to be morphologically analyzed. Consequently, also in the case where there are a plurality of combinations of an affix and a word base for the unknown word in the text, it is possible to select the optimal combination of an affix and a word base with a great possibility. Consequently, the text can be analyzed more accurately.

These objects as well as other objects, features and advantages of the invention will become more apparent to those skilled in the art from the following description with reference to the accompanying drawings.

BRIEF DESCRIPTION OF THE DRAWINGS

FIG. 11 is a diagram showing the storage contents of a prefix table according to the present embodiment;

FIG. 12 is a diagram showing the storage contents of a suffix table according to the present embodiment;

FIG. 13 is a diagram showing a prefix processing pattern table according to the present embodiment;

FIG. 14 is a diagram showing a suffix processing pattern table according to the present embodiment;

FIG. 15 is a diagram showing the storage contents of a word dictionary table according to the present embodiment;

FIG. 16 is a diagram showing the storage contents of a regular change form table for a verb according to the present embodiment;

FIG. 17 is a diagram showing a storage content (1) of a match prefix buffer according to the present embodiment;

FIG. 18 is a diagram showing a storage content (1) of a match suffix buffer according to the present embodiment;

FIG. 19 is a diagram showing a storage content (1) of a word base buffer according to the present embodiment;

FIG. 20 is a diagram showing a storage content (1) of a word base dictionary retrieval buffer according to the present embodiment;

FIG. 21 is a diagram showing a storage content (1) of a dictionary retrieval buffer according to the present embodiment;

FIG. 22 is a diagram showing a storage content (2) of the match prefix buffer according to the present embodiment;

FIG. 23 is a diagram showing a storage content (2) of the match suffix buffer according to the present embodiment;

FIG. 24 is a diagram showing a storage content (2) of the word base buffer according to the present embodiment;

FIG. 25 is a diagram showing a storage content (2) of the word base dictionary retrieval buffer according to the present embodiment;

FIG. 26 is a diagram showing a storage content (2) of the dictionary retrieval buffer according to the present embodiment;

FIG. 27 is a diagram showing a storage content (3) of the match prefix buffer according to the present embodiment;

FIG. 28 is a diagram showing a storage content (3) of the match suffix buffer according to the present embodiment;

FIG. 29 is a diagram showing a storage content (3) of the word base buffer according to the present embodiment;

FIG. 30 is a diagram showing a storage content (3) of the word base dictionary retrieval buffer according to the present embodiment;

FIG. 31 is a diagram showing a storage content (3) of the dictionary retrieval buffer according to the present embodiment;

FIG. 32 is a diagram showing a storage content (4) of the dictionary retrieval buffer according to the present embodiment;

FIG. 33 is a diagram showing a storage content (4) of the match suffix buffer according to the present embodiment;

FIG. 34 is a diagram showing a storage content (4) of the word base buffer according to the present embodiment;

FIG. 35 is a diagram showing a storage content (4) of the word base dictionary retrieval buffer according to the present embodiment;

FIG. 36 is a diagram showing a storage content (5) of the word base dictionary retrieval buffer according to the present embodiment;

FIG. 37 is a diagram showing a storage content (5) of the dictionary retrieval buffer according to the present embodiment;

FIG. 38 is a diagram showing a storage content (6) of the word base dictionary retrieval buffer according to the present embodiment;

FIG. 39 is a diagram showing a storage content (6) of the dictionary retrieval buffer according to the present embodiment;

FIG. 40 is a diagram showing a storage content (7) of the word base dictionary retrieval buffer according to the present embodiment;

FIG. 41 is a diagram showing a storage content (7) of the dictionary retrieval buffer according to the present embodiment;

FIG. 42 is a diagram showing a storage content (8) of the word base dictionary retrieval buffer according to the present embodiment; and FIG. 43 is a diagram showing a storage content (8) of the dictionary retrieval buffer according to the present embodiment.

DETAILED DESCRIPTION OF THE PREFERRED EMBODIMENTS

Figure 1:
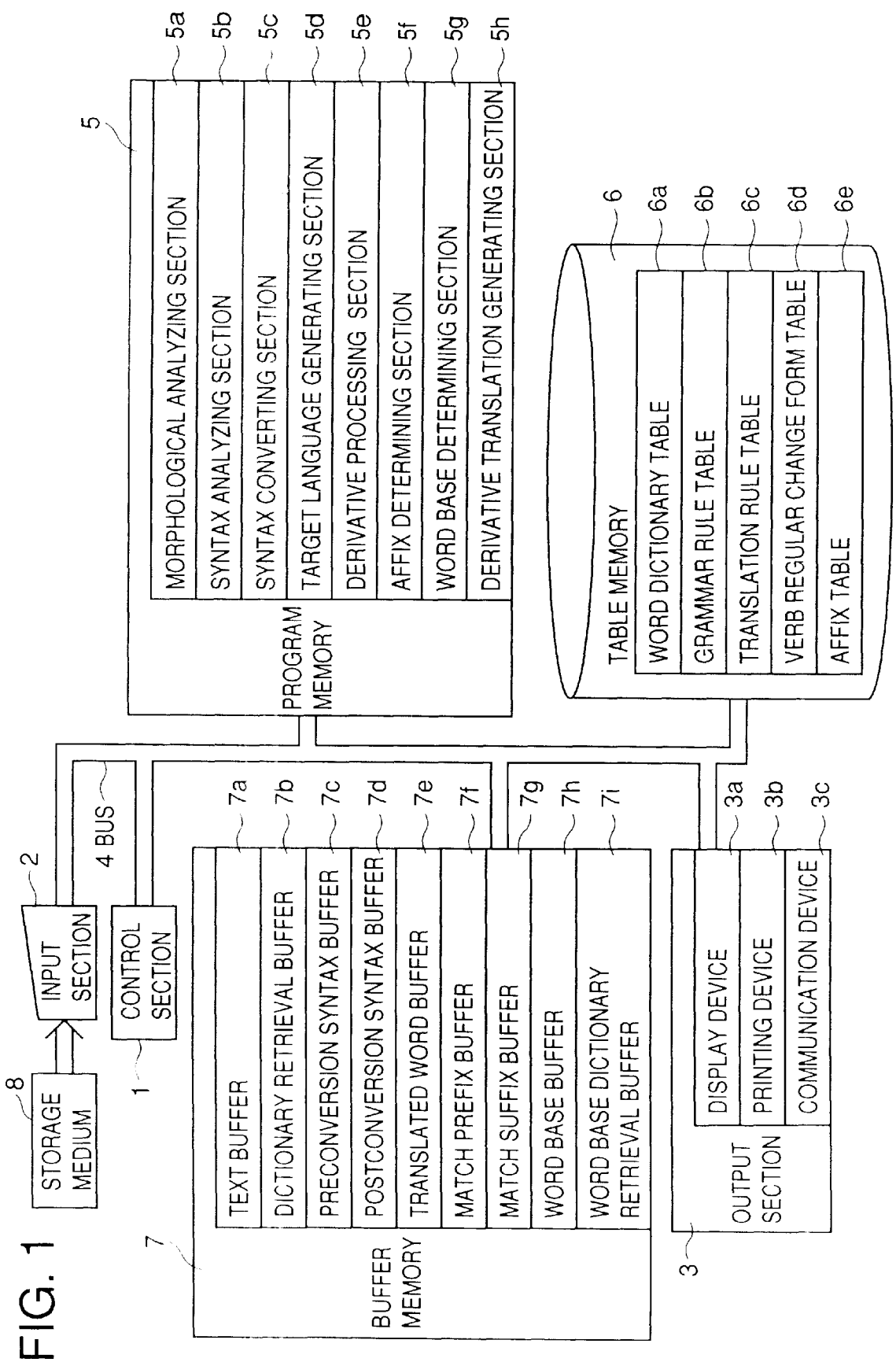
FIG. 1 is a block diagram showing the structure of a translator according to an embodiment of the present invention.

In the present invention, a word dictionary in which the translated word of a second language for the word of a first language, information about a part of speech, information about grammar and the like are registered, an affix dictionary in which a prefix information, a suffix information, affix processing conditions and the like are registered, and an affix translation change information table may be constituted by a storage medium fixedly holding a program which includes a tape system such as a magnetic tape or a cassette tape which can be separated from a body, a disk system such as a magnetic disk, for example, a floppy disk, a hard disk or the like, an optical disk, for example, a CD-ROM/MO/MD/DVD or the like, a card system such as an IC card (including a memory card)/an optical card or the like, or a semiconductor memory such as a mask ROM, an EPROM, an EEPROM, a flush ROM or the like.

An input section may be constituted by an input device such as a keyboard, a mouse, a pen, a tablet or the like, a communication device, a storage medium reader or the like, for example.

A converting section, a recognizing section, a derivative translation generating section and an affix determining section may be constituted by a computer comprising a CPU, a ROM, a RAM and an I/O port, for example.

The converting section, the recognizing section, the derivative translation generating section and the affix determining section function as a morphological analyzing section, a syntax analyzing section, a syntax converting section, a derivative processing section and a target language generating section.

In the present invention, the affix implies a prefix and a suffix. Moreover, the word base is a word having the basic meaning of a derivative thereof. The derivative implies a word having the form of "prefix+word base", "word base+suffix" or "prefix+word base+suffix".

The affix processing condition may be information about the length of an affix, information about the change form of a verb of the word base or information about a part of speech of the word base. The information may be combined. Furthermore, the affix processing condition may be information about a hyphen between an affix and a word base.

There may be further provided a word base determining section for determining one word base based on a verb change form information given from the language characteristic information when the recognizing section recognizes a derivative having a plurality of word bases for one affix, the derivative translation generating section generating a translated word of a derivative including a word base determined by the word base determining section and an affix corresponding thereto.

With such a structure, the word base determining section may be constituted by a CPU.

According to this structure, the word base of the derivative is determined based on the verb change form information given from the language characteristic information of a source language. Consequently, also in the case where there are a plurality of word bases which have affixes uniquely defined for a derivative and can be linked thereto, an optimal word base is determined. Therefore, the morphological analysis for the derivative can be performed accurately.

The affix dictionary may further include an affix translation change information table in which an affix translation change information for changing a translated word of an affix corresponding to a part of speech of a word base and a conjugated form thereof is stored, the derivative translation generating section changing a translated word of an affix corresponding to a translated word of a word base based on the affix translation change information.

With such a structure, the affix translation change information table may be constituted by a ROM.

According to this structure, when the translated word of the derivative is to be generated, the translated word of the affix can be changed corresponding to the translated word of the word base. Therefore, it is possible to generate a more natural translated word as a derivative.

The derivative translation generating section may process, as a known word, a derivative having a translated word generated once.

Preferred embodiments of the present invention will be described below in detail with reference to-the accompanying drawings. The present invention is not restricted to the following embodiments.

FIG. 1 is a block diagram showing the structure of a translator according to an embodiment of the present invention. While a machine translator in which a source language (an original language) is English and a target language (an object language) is Japanese will be taken as an example for easy understanding in the present embodiment, it is also possible to use a machine translator in which a source language (an original language) and a target language (an object language) are intended for other languages such as German, French, Spanish, Dutch, Russian, Chinese and the like.

In FIG. 1, the reference numeral 1 denotes a control section comprising a CPU (Central Processing Unit) of a computer. The control section 1 serves to control each portion based on a control program stored in a program memory.

The reference numeral 2 denotes an input section comprising an input device such as a keyboard, a mouse, a pen, a tablet, a scanner, a character recognizing device or the like, a communication device connected to a communication line, a storage medium reader and the like. The input section 2 serves to execute communication and program installation as well as the specification of a language for translation, the input of an original language and the indication of the start of the translation.

The reference numeral 3 denotes an output section comprising a display device 3a including a CRT (cathode ray tube) display, a LCD (liquid crystal display), a PD (plasma display) or the like, a printing device 3b such as a thermal printer, a laser printer or the like and a communication device 3c connected to a communication line. The output section 3 serves to display, on the display device 3a, the result of input obtained by the input section 2 and the result of translation under the control of the control section 1, and to perform printing through the printing device 3b and transmission through the communication device 3c.

The reference numeral 4 denotes a bus line on which control program data and address data are to be transferred.

The reference numeral 5 denotes a program memory comprising a storage medium including a semiconductor memory such as a mask ROM, an EPROM, an EEPROM, a flush ROM or the like, a tape system such as a magnetic tape, a cassette tape or the like, a disk system such as a magnetic disk, for example, a floppy disk, a hard disk or the like, or an optical disk, for example, a CD-ROM/MO/MD/DVD or the like, a card system such as an IC card (including a memory card)/an optical card, and the like. The program memory 5 stores each of control programs for functioning as a morphological analyzing section 5a, a syntax analyzing section 5b, a syntax converting section 5c, a target language generating section 5d, a derivative processing section 5e, an affix determining section 5f, a word base determining section 5g and a derivative translation generating section 5h.

In particular, the morphological analyzing section 5a, the syntax analyzing section 5b, the syntax converting section 5c and the target language generating section 5d function as a converting section for converting the input original language of a first language into the translated word of a second language (a target language).

By reading the control program from the program memory 5 to control each portion according to the control operation of the control section 1, the translator according to the present invention can be implemented.

The reference numeral 6 denotes a table memory comprising a storage medium including a semiconductor memory such as a mask ROM, an EPROM, an EEPROM, a flush ROM or the like, a tape system such as a magnetic tape, a cassette tape or the like, a disk system such as a magnetic disk, for example, a floppy disk, a hard disk or the like, or an optical disk, for example, a CD-ROM/MO/MD/DVD or the like, a card system such as an IC card (including a memory card)/an optical card, and the like. The table memory 6 stores each of tables for functioning as a word dictionary table 6a which stores a second language corresponding to a first language, a grammar rule table 6b which stores a grammar rule given from a language characteristic information, a translation rule table 6c which stores a translation rule, a verb rule change form table 6d which stores the regular change form information about a verb given from the language characteristic information, and an affix table (a prefix table, a suffix table, a prefix processing pattern table, a suffix processing pattern table) 6e which stores an affix translation change information for changing the translated word of an affix corresponding to affix processing conditions given from the language characteristic information, the part of speech of a word base and a conjugated form thereof.

Moreover, information about the length of an affix, information about the verb change form of a word base, information about a part of speech of a word base and information about a hyphen between an affix and a word base may be used as the affix processing conditions.

The reference numeral 7 denotes a buffer memory comprising a storage medium including a semiconductor memory such as a mask RAM, an EEPROM, a flush ROM or the like, a tape, system such as a magnetic tape, a cassette tape or the like, a disk system such as a magnetic disk, for example, a floppy disk, a hard disk or the like, or an optical disk, for example, a MO/MD/DVD or the like, a card system such as an IC card (including a memory card)/an optical card, and the like. The buffer memory 7 is provided in regions for functioning as a text buffer 7a, a dictionary retrieval buffer 7b, a preconversion syntax buffer 7c, a postconversion syntax buffer 7d, a translated word buffer 7e, a match prefix buffer 7f, a match suffix buffer 7g, a word base buffer 7h and a word base dictionary retrieval buffer 7i.

The control section 1 serves to store, in each buffer, data processed according to the progress of a translation processing and a derivative processing. The derivative having a translated word generated once is processed as a known word.

The reference numeral 8 denotes a storage medium fixedly holding a program which is constituted by media capable of being separated from a body including a semiconductor memory such as a mask ROM, an EPROM, an EEPROM, a flush ROM or the like, a tape system such as a magnetic tape, a cassette tape or the like, a disk system such as a magnetic disk, for example, a floppy disk, a hard disk or the like, or an optical disk, for example, a CD-ROM/ MO/MD/DVD or the like, a card system such as an IC card (including a memory card)/an optical card, and the like. The machine translating program according to the present invention may be stored in the storage medium 8 and be installed in the spare region of the buffer memory 7 by the storage medium reader of the input section 2, thereby implementing the translating function of the present invention.

Moreover, in the case where the translator comprises a communication device which can be connected to a communication network provided on the outside including an internet, the storage medium may freely hold a program to download the program from the communication network through the communication device. In the case where the program is to be thus downloaded from the communication network, a program for the downloading may be preliminarily stored in a body apparatus or may be installed from another recording medium. The contents stored in the recording medium are not restricted to the program but may be data.

According to another aspect of the present invention, by using a storage medium in which a translating program capable of being read by a computer is stored for a translator comprising a word dictionary 6a, an affix dictionary 6e and an input section 2 for inputting an original language to be a first language, wherein the computer 1 is caused to refer to the word dictionary 6a, thereby converting the input original language into a translated word to be a second language, is caused to refer to the word dictionary 6a and the affix dictionary 6e, thereby recognizing a derivative having an affix and a word base from the input original language which cannot be converted into the translated word, is caused to link a translated word corresponding to the affix of the recognized derivative to a translated word corresponding to the word base, thereby generating a translated word of one derivative, is caused to determine one affix based on an affix processing condition given from a language characteristic information when a derivative including a plurality of affixes is recognized, and is caused to generate a translated word of a derivative having the determined affix and a word base corresponding thereto.

Figure 2:
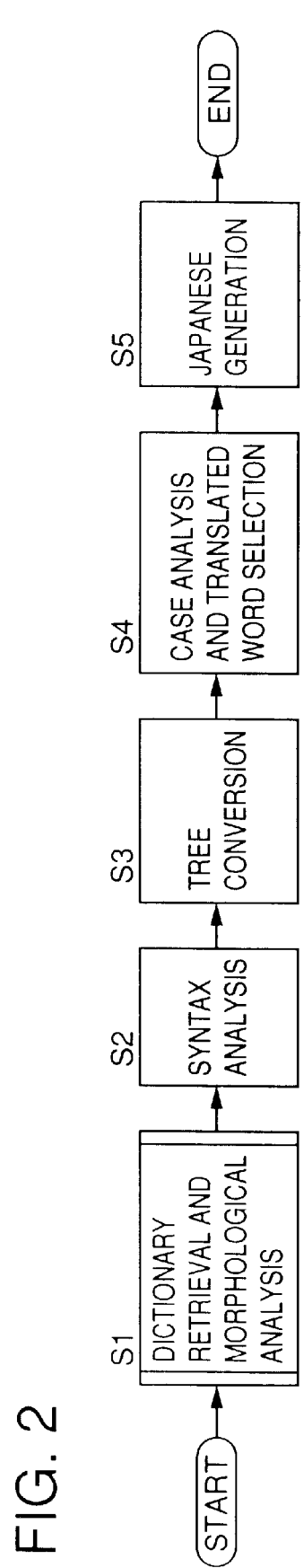
FIG. 2 is a block diagram showing the procedure for each translation processing to be carried out by the translator according to the present embodiment.

FIG. 2 is a block diagram showing the procedure for each translation processing to be carried out by the translator in FIG. 1. As shown in FIG. 2, a syntax transfer method is taken as an example of the machine translating method. This method executes dictionary retrieval and morphological analysis for an input text of a source language at S1, carries out syntax analysis to proceed each analysis, thereby obtaining the syntax structure of the source language at S2, converts the syntax structure into the syntax structure tree of a target language at S3, selects the translated word from each result of analysis at S4, and generates a target language at S5.

Each of the processings to be carried out at S1 and S2 shown in FIG. 2 will be described below.

[Dictionary Retrieval and Morphological Analysis] at S1

The morphological analyzing section 5a serves to retrieve a word from an input text, to divide the input text into each morphological string (word string) to obtain a grammar information such as a part of speech and a translated word for each word by using the word dictionary table 6a, the grammar rule table 6b and the translation rule table 6c, and furthermore, serves to analyze a tense, a person, a number and the like by using the verb regular change form table 6d.

[Syntax Analysis] at S2

The syntax analyzing section 5b serves to analyze the structure of a sentence such as a dependency between the morphologically analyzed words to determine a structural analysis tree by using the grammar rule table 6b.

Figure 3:
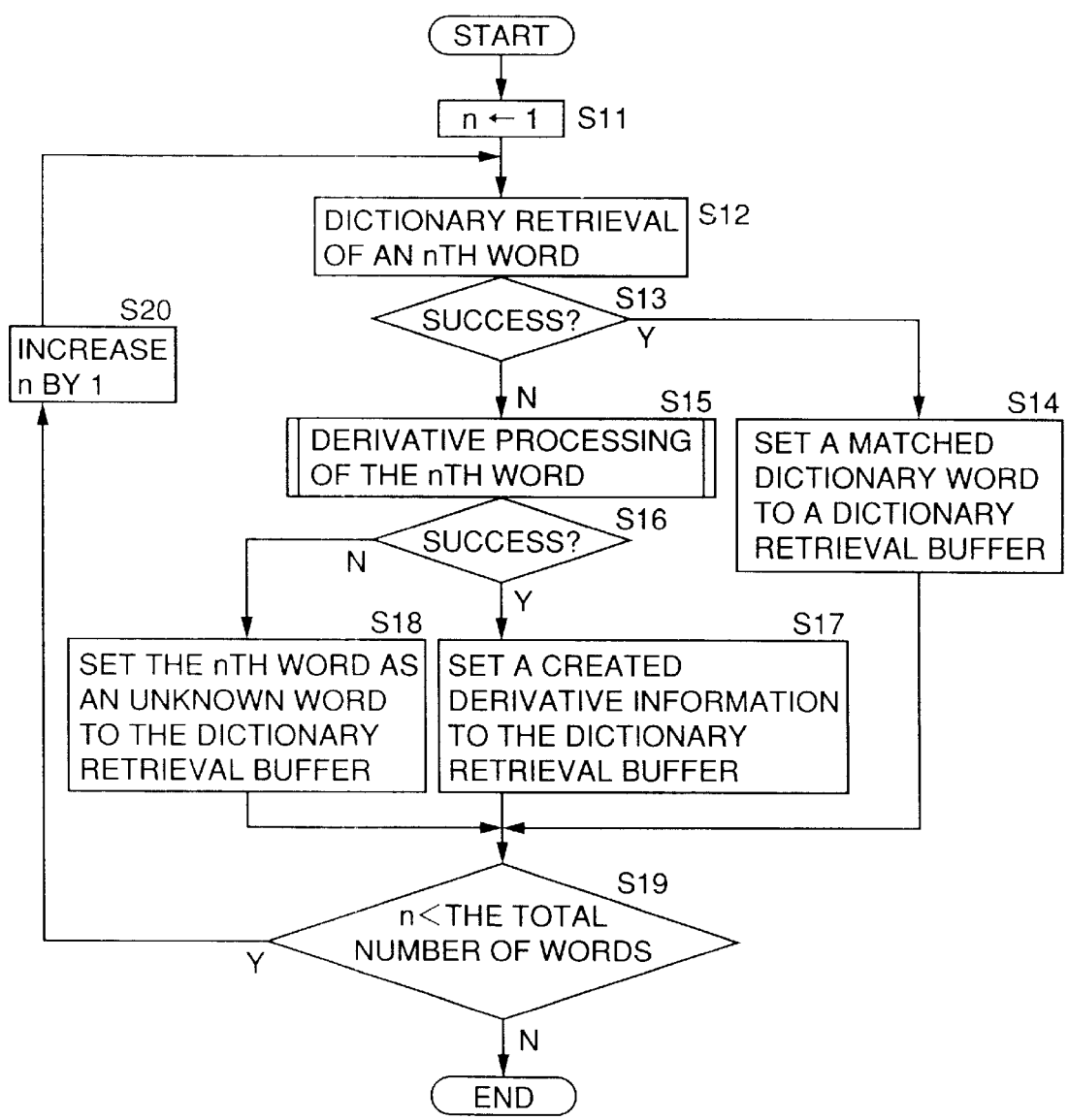
FIG. 3 is a flowchart showing the procedure for a translation processing (1) according to the present embodiment.

FIG. 3 is a flowchart showing the procedure for a translation processing (1) according to the present embodiment. In FIG. 3, the procedure for the dictionary retrieval and morphological analysis processing shown in FIG. 2 will be described.

When a text is input to the text buffer 7a at S11, a division for each word is first carried out to obtain the total number of words. The routine proceeds to an operation for dictionary retrieval in which 1 is set to a word position variable of n.

At S12, the dictionary retrieval of an nth word is attempted to proceed to a processing of S19 through any processing path. If the n does not reach the total number of words, the n is increased by 1 at S20 to return to the processing of S12. Such an operation is repeated.

At S12, the dictionary retrieval of the nth word is carried out. If the dictionary retrieval is successful, a word of the dictionary data is stored in the dictionary retrieval buffer 7b at S14 and the routine proceeds to the processing of S19.

Moreover, if the dictionary retrieval of the nth word is carried out and is unsuccessful so that a known word cannot be retrieved at S12, the derivative processing of the nth word is carried out at S15.

If the derivative processing is successful, information about a derivative is stored in the dictionary retrieval buffer 7b at S17 and the routine then proceeds to the processing of S19.

If the derivative processing is unsuccessful at S15, the nth word is treated as an unknown word and is stored in the dictionary retrieval buffer 7b at S18.

If the n reaches the total number of words at S19, the dictionary retrieval and morphological analysis processing is ended to proceed to the syntax analysis processing at S2 shown in FIG. 2.

[First Embodiment]

In a first embodiment, the procedure for the derivative processing of three kinds of English words (source language) of "exportable", "uncleared" and "nonradioactive" will be described, for example.

As a first example for selecting a proper affix in consideration of the features of the source language, the derivative processing of the English word of "exportable" is carried out in relation to the length of the affix.

Figure 4:
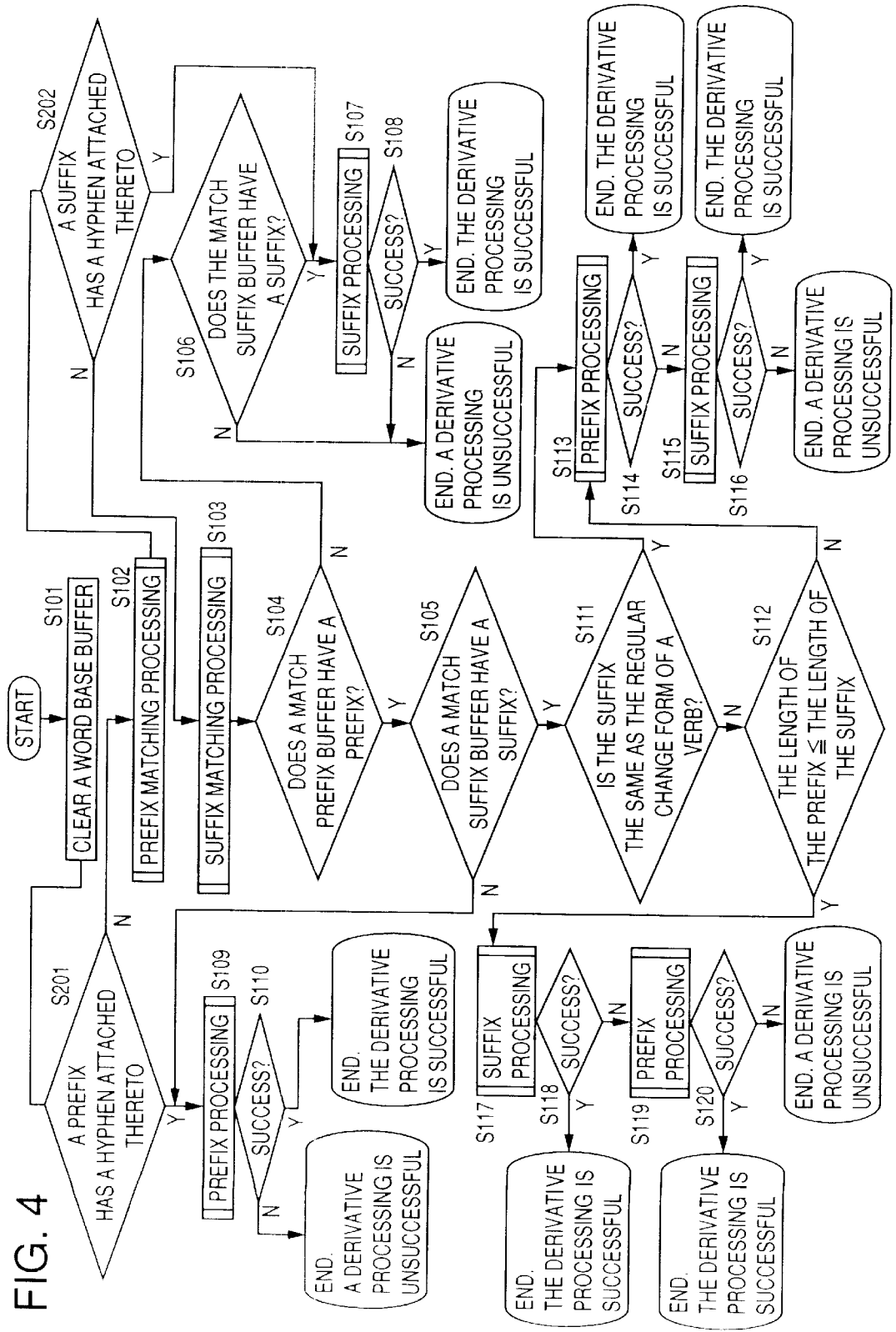
FIG. 4 is a flowchart showing the procedure for a translation processing (2) according to the present embodiment.

FIG. 4 is a flowchart showing the procedure for a translation processing (2) according to the present embodiment. Moreover, FIG. 4 shows, in detail, "the derivative processing of the nth word" at S15 of FIG. 3, illustrating the procedure for an operation of the derivative processing for one input word.

At S101, the word base buffer 7h is cleared. Then, the routine proceeds to S102 where a prefix matching processing is carried out.

Between the processings of S101 and S102, it is also possible to set a processing of S201 where it is decided whether or not a hyphen is attached to a prefix. If the hyphen is attached to the prefix, it is considered that the prefix has been determined and the routine proceeds to a prefix processing of S109. If the hyphen is not attached to the prefix, the routine proceeds to the processing of S102.

Figure 5:
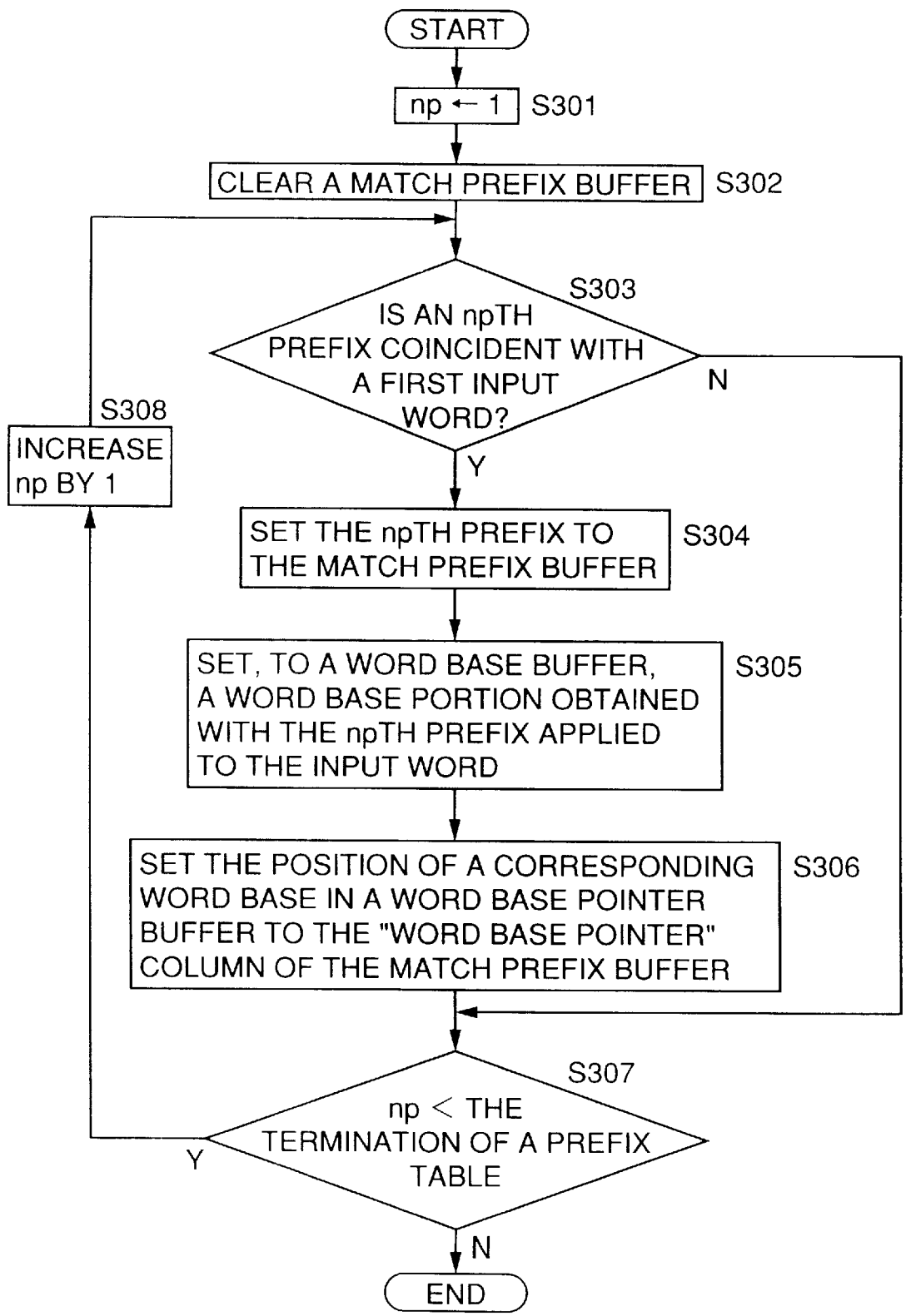
FIG. 5 is a flowchart showing the procedure for a translation processing (3) according to the present embodiment.

FIG. 5 is a flowchart showing the procedure for a translation processing (3) according to the present embodiment. Moreover, FIG. 5 shows, in detail, the "prefix matching processing" of S101 in FIG. 4.

In FIG. 5, 1 is set to a pointer variable np of the prefix table at S301, the match prefix buffer 7f is cleared at S302, and the matching with the prefix of an npth record of the prefix table is attempted to proceed to a processing of S307 through any processing path. If the np does not reach the termination of the prefix table, it is increased by 1 at S308 to proceed to the processing of S303. Such an operation is repeated.

The word of "exportable" is matched with the prefix of "ex" having an ID (record number) of 1 with reference to the prefix table shown in FIG. 11. Therefore, when the np is 1, the routine proceeds from S303 to S304 where the first prefix of "ex" of the ID is set to the match prefix buffer 7f.

At S305, a word base is obtained with the input word of "exportable" defined as a derivative having the prefix of "ex" attached thereto. As a result, a character string of "portable" is set to the word base buffer 7h.

At S306, a record number of "1" of the word base buffer 7h for storing the "portable" is stored in the "word base pointer" column of the first record of the match prefix buffer 7f in order to relate the prefix to the word base. As a result, the match prefix buffer 7f has the storage contents shown in FIG. 17.

Only the above-mentioned "ex" in the prefixes of the prefix table shown in FIG. 11 is matched with the input word of "exportable". Therefore, the prefix matching processing shown in FIG. 5 is ended and the routine returns to the processing shown in FIG. 4. Thus, the routine proceeds from S102 to S103 where the suffix matching processing is executed.

Between the processings of S102 and S103, it is also possible to set a processing of S202 where it is decided whether or not a hyphen is attached to a suffix. If the hyphen is attached to the suffix, it is considered that the suffix has been determined and the routine proceeds to a suffix processing of S107. If the hyphen is not attached to the suffix, the routine proceeds to the processing of S103.

Figure 6:
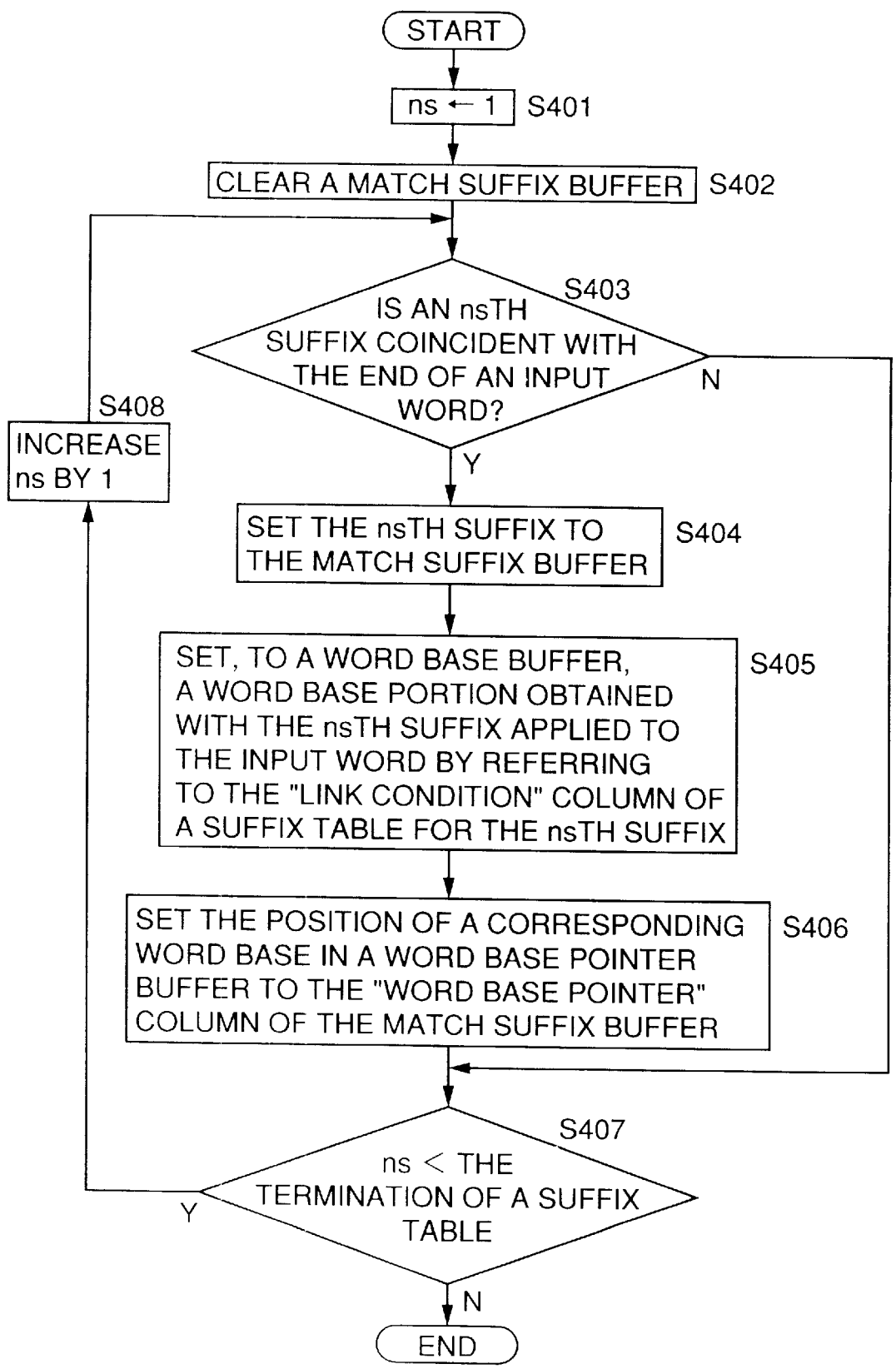
FIG. 6 is a flowchart showing the procedure for a translation processing (4) according to the present embodiment.

FIG. 6 is a flowchart showing the procedure for a translation processing (4) according to the present embodiment. Moreover, FIG. 6 shows, in detail, the "suffix matching processing" of S103 in FIG. 4.

In FIG. 6, 1 is set to a pointer variable ns of the suffix table at S401 and the routine then proceeds to S402 where the match suffix buffer 7g is cleared.

After the matching with the suffix of an nsth record of the suffix table is attempted at S403 and the routine then proceeds to S407 through any processing path. If the ns does not reach the termination of the suffix table, it is increased by 1 at S408 to proceed to the processing of S403. Such an operation is repeated.

The word of "exportable" is matched with the suffix of "able" having an ID (record number) of 1 with reference to the suffix table shown in FIG. 12. Therefore, when the ns is 1, the routine proceeds from S403 to S404 where the first suffix of "able" of the ID is set to the match suffix buffer 7g.

At S405, a word base is obtained by referring to the "link condition" column of the first suffix of "able" of the ID with the input word of "exportable" defined as a derivative having the suffix of "able" attached thereto. As a result, a character string of "export" obtained by simply removing the suffix of "able" from "exportable" and a character string of "exporte" having "e" added to the end in consideration of a possibility that "e" on the end of the word base might be removed according to the "link condition" are set to the word base buffer 7h.

At S406, record numbers of "2" and "3" of the word base buffer 7h for storing the "export" and the "exporte" are stored in the "word base pointer" column of the first record of the match suffix buffer 7g in order to relate the suffix to the word base.

As a result, the match suffix buffer 7g has the storage contents shown in FIG. 18. The word base buffer 7h has the storage contents shown in FIG. 19.

Only the above-mentioned "able" in the suffixes of the suffix table shown in FIG. 12 is matched with the input word of "exportable". Therefore, the suffix matching processing shown in FIG. 6 is ended and the routine returns to the processing shown in FIG. 4. Thus, the routine proceeds from S103 to S104.

In the processing shown in FIG. 4, it is decided whether or not the prefix and the suffix have matching candidates, respectively.

At S104, the prefix is decided. As described above, the prefix of "ex" is stored in the match prefix buffer 7f as a result of the processing of S102 as shown in FIG. 17. Therefore, there is the prefix. Consequently, the routine proceeds to the processing of S105.

At S105, the suffix is decided. As described above, the suffix of "able" is stored in the match suffix buffer 7g as a result of the processing of S103 as shown in FIG. 18. Therefore, there is the suffix. Consequently, the routine proceeds to S111.

At this time, there are the prefix and suffix to be matched with the input word and which one of them is to be processed is determined by the following processing.

At S111, whether or not the suffix stored in the match suffix buffer 7g is the same as the regular change form of a verb is decided as one of the decisions based on the language characteristic by referring to the regular change form table shown in FIG. 16.

In this case, the suffix of "able" is not coincident with any of the regular change forms in FIG. 16. Therefore, the routine proceeds from S111 to S112.

At S112, a comparison of the length of the matched prefix with that of the matched suffix is carried out as one of the decisions based on the language characteristic. If the lengths of the prefix and the suffix are equal to each other or the length of the suffix is greater than that of the prefix, the routine proceeds to S117 where a suffix processing is executed.

On the other hand, if the prefix is longer, the routine proceeds to S113 where a prefix processing is executed. In this case, since the suffix of "able" is longer than the prefix of "ex", the routine proceeds to S117.

Figure 8:
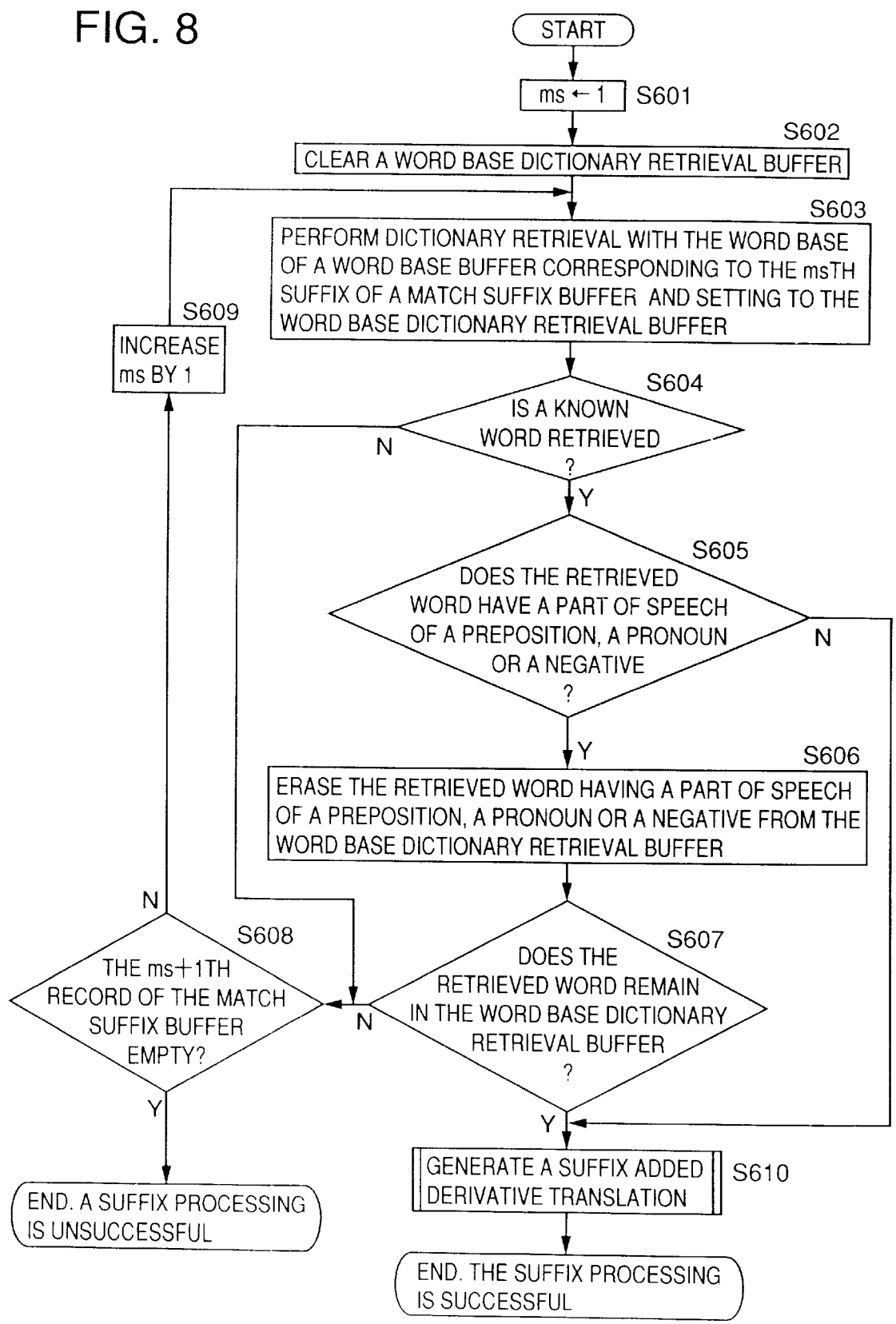
FIG. 8 is a flowchart showing the procedure for a translation processing (6) according to the present embodiment.

FIG. 8 is a flowchart showing the procedure for the operation of a translation processing (6) according to the present embodiment. Moreover, FIG. 8 shows the details of the "suffix processing" at S107, S115 and S117 in FIG. 4.

In FIG. 8, 1 is set to a pointer variable ms of a match suffix buffer at S601, the word base dictionary retrieval buffer 7i is cleared at S602, and the dictionary retrieval is carried out by using, as keys, the word bases of "export" and "exporte" of the word base buffer corresponding to the first suffix of "able" of the match suffix buffer respectively at S603.

Referring to the dictionary data shown in FIG. 15, consequently, the dictionary retrieval results in success with "export", while the dictionary retrieval results in failure with "exporte". The result of the dictionary retrieval of "export" is stored in the word base dictionary retrieval buffer 7i as shown in FIG. 20.

Referring to the "export", the dictionary retrieval has resulted in success. Therefore, the routine proceeds to S605 where a part of speech of the retrieved word is checked as one of the decisions based on the language characteristic.

In this case, the retrieved word does not have any of a negative, a preposition and a pronoun. Therefore, any data are not erased from the word base dictionary retrieval buffer 7i, and the routine then proceeds to S610.

Thereafter, a derivative translation for the derivative of "exportable" is generated and the detailed procedure for the operation will be described in a third embodiment.

As a result, information about a derivative having a known word of "export" and a suffix of "able" for the input word of "exportable" is stored in the dictionary retrieval buffer 7b as shown in FIG. 21.

In the case where there are a prefix and a suffix to be matched with the input word as in the present embodiment, the decision based on the language characteristic such as the length of the affix or the like is carried out. As a result, it is possible to prevent such an improper decision as to consider the input word of "exportable" to have the prefix of "ex" and the known word of "portable".

As a (second) example for selecting a proper affix in consideration of the features of the source language, the derivative processing for a word of "uncleared" is carried out in relation to the regular change form of a verb or the like.

In FIG. 4, the word base buffer 7h is cleared at S101, and the prefix matching processing is executed at S102 and the suffix matching processing is executed at S103. Since the detailed operation of each matching processing is the same as in the word of "exportable", it will be omitted.

As a result, a prefix of "un" is stored in the match prefix buffer 7f as shown in FIG. 22 and a suffix of "ed" is stored in the match suffix buffer 7g as shown in FIG. 23. As shown in FIG. 24, a word base of "cleared" corresponding to the prefix of "un" and a word base of "unclear" corresponding to the suffix of "ed" are stored in the word base buffer 7h.

Thus, there are a prefix and a suffix to be matched with the input word of "uncleared". Therefore, the processing proceeds in order of S103, S104, S105 and S111 in the same manner as the word of "exportable".

At S111, whether or not the suffix stored in the match suffix buffer 7g is the same as the regular change form of a verb is decided as one of the decisions based on the language characteristic by referring to the regular change form table shown in FIG. 16.

Such a decision is carried out for the following reason. In general, it is often desired that a word attached to the end in the same manner as the regular change form of a verb should not be processed as a word having a suffix but as the change form of the verb. In this case, the suffix of "ed" is coincident with one of the regular change forms of the verb shown in FIG. 16. Therefore, the processing proceeds from S111 to S113 where the prefix processing is carried out.

Figure 7:
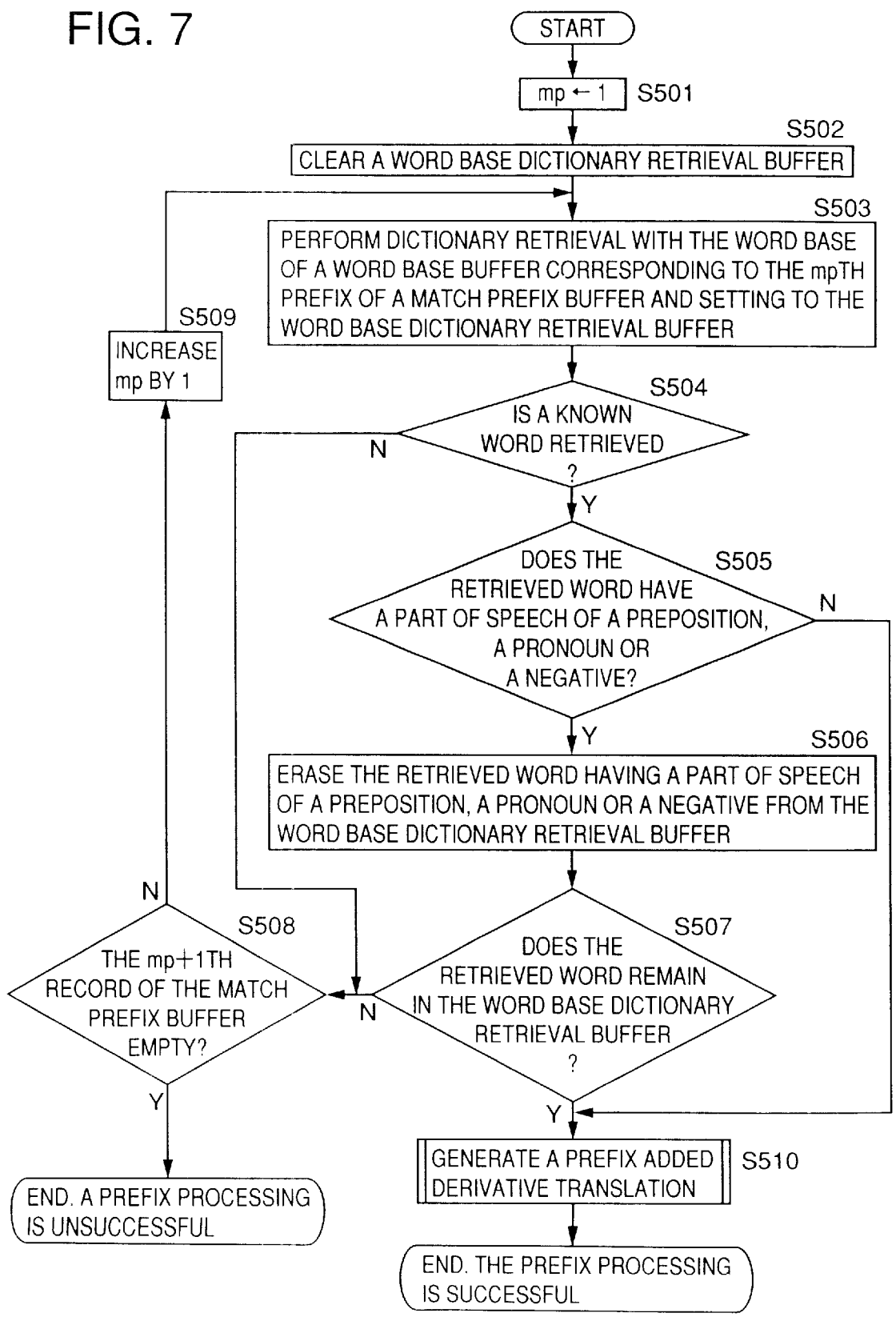
FIG. 7 is a flowchart showing the procedure for a translation processing (5) according to the present embodiment.

FIG. 7 is a flowchart showing the procedure for a translation processing (5) according to the present embodiment. Moreover, FIG. 7 shows the details of the "prefix processing" at S109, S113 and S119 in FIG. 4.

In FIG. 7, 1 is set to a pointer variable mp of a match suffix buffer at S501, the word base dictionary retrieval buffer 7i is cleared at S502, and the dictionary retrieval is carried out by using, as a key, the word base of "cleared" of the word base buffer corresponding to the first suffix of "un" of the match suffix buffer.

Referring to the word data of the word dictionary table shown in FIG. 15, consequently, the dictionary retrieval results in success as a past form of "clear" or a past participle form thereof, and the result of the dictionary retrieval of "cleared" is stored in the word base dictionary retrieval buffer 7i as shown in FIG. 25.

Referring to the "cleared", the dictionary retrieval has resulted in success. Therefore, the routine proceeds to S505 where a part of speech of the retrieved word is checked. In this case, the retrieved word does not have: any of a negative, a preposition and a pronoun. Therefore, any data are not erased from the word base dictionary retrieval buffer 7i, and the routine then proceeds to S510. Thereafter, a derivative translation for the derivative of "uncleared" is generated.

As a result, information about a derivative having a prefix of "un" and a known word of "cleared" for the input word of "uncleared" is stored in the dictionary retrieval buffer 7b as shown in FIG. 26.

As described above, in the case where there are a prefix and a suffix to be matched with an input word, the input word of "uncleared" is considered to have the known word of "unclear" and the suffix of "ed" if the decision is carried out depending on the length of the affix. As a result, although a translation of "made unclear" is obtained, for example, the decision is carried out based on the language characteristics such as a priority given to an affix having a regular change form of a verb in the decision depending on the length of the affix. Consequently, it is possible to prevent an improper decision.

While "the length of the affix" and "the regular change form of the verb" have been utilized in the above-mentioned embodiment in consideration of the features of a source language, the features of the source language which can be utilized by the present invention are not restricted thereto.

As described above, the derivative processing section according to the present embodiment has the function of selecting a proper affix based on the language characteristics if there are a prefix and a suffix matched with the input word. The affix thus selected is not always proper. Therefore, an operation to be carried out in that case will be described.

Next, description will be given to an example in which the failed processing results in success by a subsequent backup processing. The derivative processing for a word of "non-radioactive" will be described.

In FIG. 4, the word base buffer 7h is cleared at S101, the prefix matching processing is executed at S102, and the suffix matching processing is executed at S103.

Since the detailed operation of each matching processing is the same as in the word of "exportable", it will be omitted.

As a result, a prefix of "non" is stored in the match prefix buffer 7f as shown in FIG. 27 and a suffix of "ive" is stored in the match suffix buffer 7g as shown in FIG. 28. As shown in FIG. 29, a word base of "radioactive" corresponding to the prefix of "non" and a word base of "nonradioact" corresponding to the suffix of "ive" are stored in the word base buffer 7h.

Thus, there are a prefix and a suffix matched with the input word of "nonradioactive". Therefore, the processing proceeds in order of S103, S104, S105 and S111 shown in FIG. 4 in the same manner as the word of "exportable".

At S111, it is decided whether or not the suffix stored in the match suffix buffer 7g is the same as the regular change form of a verb. In this case, the suffix of "ive" is not coincident with any of the regular change forms in FIG. 16. Therefore, the processing proceeds from S111 to S112.

At S112, the length of the matched prefix is compared with that of the matched suffix. In this case, since the lengths of the prefix of "non" and the suffix of "ive" are equal to each other, the routine proceeds to a processing of S117.

The routine proceeds to a processing shown in FIG. 8. 1 is set to a pointer variable ms of the match suffix buffer 7g at S601, and the word base dictionary retrieval buffer 7i is cleared at S602.

Next, the routine proceeds to S603 where the dictionary retrieval is carried out by using, as a key, the word base of "nonradioact" of the word base buffer corresponding to the first suffix of "ive" of the match suffix buffer.

Referring to the word data of the word dictionary table shown in FIG. 15, consequently, the "nonradioact" is an unknown word as shown in FIG. 30 and the dictionary retrieval results in failure. Therefore, the routine proceeds to S608. However, since a second record of the match suffix buffer 7g is empty as shown in FIG. 28, the suffix processing results in failure.

Since the suffix processing has resulted in failure, the routine returns to the processing shown in FIG. 4 and proceeds in order of S117, S118 and S119. At this time, the prefix processing is carried out.

The routine proceeds to the processing shown in FIG. 7 where 1 is set to the pointer variable mp of the match prefix buffer 7f at S501 and the word base dictionary retrieval buffer 7i is cleared at S502.

The routine proceeds to S503 where the dictionary retrieval is carried out by using, as a key, the word base of "radioactive" of the word base buffer 7h corresponding to the first suffix of "non" of the match prefix buffer 7f.

Referring to the dictionary data of the word dictionary table shown in FIG. 15, consequently, the dictionary retrieval results in success and the result of the dictionary retrieval of "radioactive" is stored in the word base dictionary retrieval buffer 7i as shown in FIG. 31.

Referring to the word of "radioactive", the dictionary retrieval has resulted in success. Therefore, the routine proceeds to S505 where a part of speech of the retrieved word is checked. In this case, the retrieved word does not have any of a negative, a preposition and a pronoun. For this reason, any data are not erased from the word base dictionary retrieval buffer 7i, and the routine then proceeds to S510 where a derivative translation for the derivative of "nonradioactive" is generated.

As a result, information about a derivative having a prefix of "non" and a known word of "radioactive" for the input word of "nonradioactive" is stored in the dictionary retrieval buffer 7b as shown in FIG. 32.

As described above, the derivative processing section according to the present embodiment can execute a proper recovery processing even if the initially selected affix is erroneous.

According to the first embodiment, an affix is determined based on the language characteristic information of a source language when an unknown word in a text is to be morphologically analyzed. Consequently, also in the case where there are a plurality of combinations of an affix and a word base for the unknown word in the text, it is possible to select the optimal combination of an affix and a word base with a great possibility. Consequently, the text can be analyzed more accurately.

[Second Embodiment]

In a second embodiment, the features of the present invention will be described by taking the derivative processing of a word of "noter" as an example.

In FIG. 4, a word base buffer 7h is cleared at S101 and a prefix matching processing is carried out at S102.

Next, the routine proceeds to a processing shown in FIG. 5. 1 is set to a pointer variable np of a prefix table at S301 and a match prefix buffer 7f is cleared at S302. As described above, the operation is repeated by increasing the np by 1.

In the case of the word of "noter", there is no prefix to be matched with reference to a prefix table shown in FIG. 11. Accordingly, information is not set to a match prefix buffer 7f but the prefix matching processing shown in FIG. 5 is ended when the np reaches the termination of the prefix table. Then, the routine returns to the processing shown in FIG. 4 and proceeds from S102 to S103 where a suffix matching processing is carried out.

The routine proceeds to a processing shown in FIG. 6 where 1 is set to a pointer variable ns of a suffix table at S401 and a match suffix buffer 7g is cleared at S402. As described above, the operation is repeated by increasing the ns by 1.

By referring to a suffix table shown in FIG. 12, the word of "noter" is matched with a suffix of "er" having an ID (record number) of 4. Therefore, when the ns is 4, the routine proceeds from S403 to S404 where the fourth suffix of "er" shown in FIG. 12 is set to the match suffix buffer 7g.

At S405, in the case where the input word of "noter" is defined as a derivative having the suffix of "er" attached thereto, a word base is obtained by referring to the "link condition" column of the fourth suffix of "er" in FIG. 12. As a result, a character string of "not" obtained by simply removing the suffix of "er" from the "noter" and a character string of "note" obtained by considering the removal of "e" on the end of the word base according to the "link condition" to add "e" to the end are set to the word base buffer 7h.

At S406, record numbers of "1" and "2" of the word base buffer 7h in which "not" and "note" are stored in the "word base pointer" column of the first record of the match suffix buffer 7g in order to relate the suffix to the word base. As a result, the match suffix buffer 7g has the storage contents shown in FIG. 33. The word base buffer 7h has the storage contents shown in FIG. 34.

Only the above-mentioned "er" in the suffixes of the suffix table shown in FIG. 12 is matched with the input word of "noter". Therefore, the suffix matching processing shown in FIG. 6 is ended and the routine returns to the processing shown in FIG. 4. Thus, the routine proceeds from S103 to S104.

Next, it is decided whether or not there are matching candidates for the prefix and the suffix, respectively. In this case, there is no prefix to be matched with the input word of "noter" and there is only the suffix to be matched. Therefore, the routine proceeds in order of S103, S104, S106 and S107 in FIG. 4.

The routine proceeds to a processing shown in FIG. 8 where 1 is set to a pointer variable ms of the match suffix buffer 7g at S601 and a word base dictionary retrieval buffer 7i is cleared at S602.

Then, the routine proceeds to S603 where the dictionary retrieval is carried out by using, as keys, the word bases of "not" and "note" of the word base buffer 7h corresponding to the first suffix of "er" of the match suffix buffer 7g, respectively.

Referring to the dictionary data of the word dictionary table shown in FIG. 15, consequently, the dictionary retrieval results in success with both "not" and "note", and the results of the dictionary retrieval of the "not" and the "note" are stored in the word base dictionary retrieval buffer 7i as shown in FIG. 35.

Since the dictionary retrieval has resulted in success, the routine proceeds to S605 where a part of speech of the retrieved word is checked as one of decisions based on the language characteristics. In this case, the "not" has a part of speech of a negative. Therefore, the routine proceeds to S606 where information about the "not" is erased from the word base dictionary retrieval buffer 7i. As a result, only the information about the "note" remains in the word base dictionary retrieval buffer 7i as shown in FIG. 36.

Then, the routine proceeds to S607. Since the information remains in the word base dictionary retrieval buffer 7i, the routine proceeds to S610 where a derivative translation for the derivative of "noter" is generated.

As a result, information about a derivative having a known word of "note" and a suffix of "er" for the input word of "noter" is stored in the dictionary retrieval buffer 7b as shown in FIG. 37.

As described above, in the case where there are a plurality of word bases to be matched with the same affix for the input word, a decision is carried out based on the language characteristics of a part of speech and the like as in the present embodiment. Consequently, it is possible to prevent such an improper decision as to consider the input word of "noter" to have the known word of "not" and the suffix of "er".

According to the second embodiment, a word base is determined based on the language characteristic information of a source language when an unknown word in a text is to be morphologically analyzed. Consequently, also in the case where an affix is uniquely determined for an unknown word in a text and plural combinations of word bases can be linked thereto, it is possible to select an optimal word base with a great possibility. Consequently, the text can be analyzed more accurately.

[Third Embodiment]

In a third embodiment, the features of the present invention will be described by-taking, as an example, a derivative translation generating processing using two English words of "nonradioactive" and "nonremunerative" for a prefix processing and two English words of "amiableness" and "abidingness" for a suffix processing.

[Prefix Processing]

The derivative translation generating processing for the word of "nonradioactive" will be described.

Referring to this word, the processing is executed in order of S101, S102, S103, S104, S105, S111, S112, S117, S118 and S119 in FIG. 4 as described above. Thus, the processing is carried out by regarding the word of "nonradioactive" as a derivative having a prefix of "non" and a known word of "radioactive".

Next, the routine proceeds to a processing shown in FIG. 7 in order of S501, S502, S503, S504, S505 and S510. Thus, a processing of generating a prefix added derivative translation is executed.

At this time, a word base dictionary retrieval buffer 7i has the contents of storage shown in FIG. 31.

Figure 9:
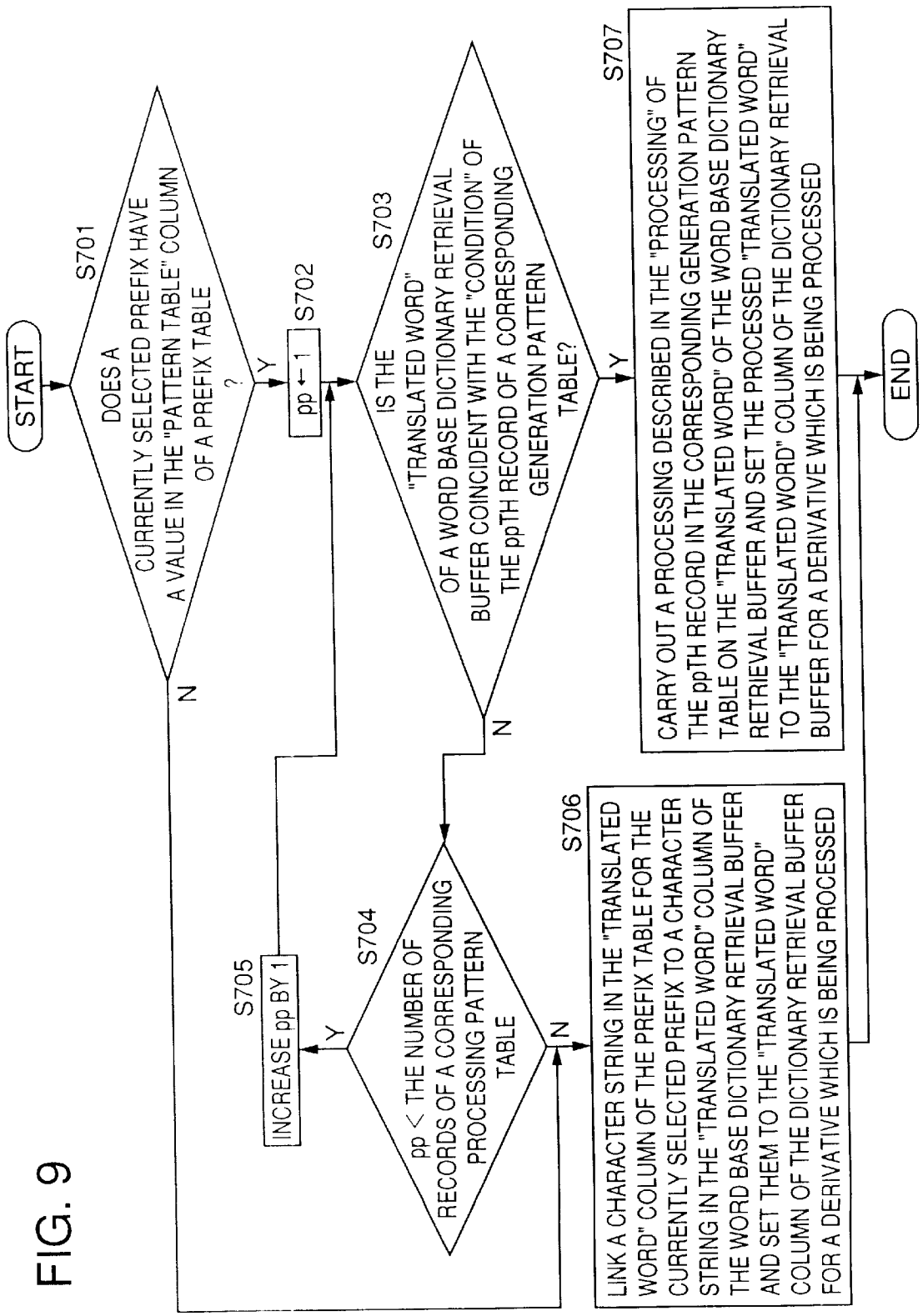
FIG. 9 is a flowchart showing the procedure for a translation processing (7) according to the present embodiment.

FIG. 9 is a flowchart showing the procedure for a translation processing (7) according to the present embodiment. Moreover, FIG. 9 shows, in detail, "the generation of a prefix added derivative translation" at S510 in FIG. 7. In FIG. 9, it is decided whether or not the "processing pattern table" column of a prefix table has a value in relation to the currently selected prefix at S701.

In this case, the selected prefix is "non" and there is a value of "101" in the processing pattern table column of "non" of the prefix table shown in FIG. 11. Therefore, the routine proceeds to S702.

At S702, 1 is set to a pointer variable pp of a prefix processing pattern table. At this time, a prefix processing pattern 101 shown in FIG. 13 is selected as a prefix processing pattern table.

At S703, it is decided, on trial, whether or not the "condition" of a ppth record of the prefix processing pattern table 101 is coincident with a translated word of "radioactive" in the translation column of the word base dictionary retrieval buffer 7i. If they are not coincident with each other, the processing proceeds in order of S703, S704, S705 and S703. The check is repeated by increasing the pp by 1 until they are coincident with each other or the pp reaches a record number in the prefix processing pattern table 101.

The translated word of "radioactive" is matched with a condition of [noun+"of の"] having an ID (record number) of 1 with reference to the prefix processing pattern table 101 shown in FIG. 13. Therefore, the routine proceeds from S703 to S704 when the pp is 1. An operation of the processing of ["non (非)"+the translated word of a word base] of the ID1 in FIG. 13 is carried out on a character string of "radioactive (放射性の)". A character string of "nonradioactive (放射性の)" thus generated is stored in the translated word column of a dictionary retrieval buffer 7b as shown in FIG. 32.

Next, the derivative translation generating processing of the word of "nonremunerative" will be described.

Referring to this word, the routine proceeds in order of S101, S102, S103, S104, S105, S111, S112, S117, S118 and S119 in FIG. 4 by referring to the prefix table shown in FIG. 11 and the suffix table shown in FIG. 12. Thus, the processing is carried out by regarding the word of "nonremunerative" as a derivative having a prefix of "non" and a known word of "remunerative".

Next, the routine proceeds to a processing shown in FIG. 7 in order of S501, S502, S503, S504, S505 and S510. Thus, a processing of generating a prefix added derivative translation is started. At this time, the word base dictionary retrieval buffer 7i has the contents of storage shown in FIG. 38.

The routine proceeds to a processing shown in FIG. 9. In this case, the selected prefix is "non" in the same manner as described above. Therefore, the routine proceeds from S701 to S702 and S703. The prefix processing pattern 101 shown in FIG. 13 is selected as a prefix processing pattern table, and it is decided whether or not a translated word of "remunerative (利益がある)" in the translated word column of the word base dictionary retrieval buffer 7i is coincident with any record order of the prefix processing pattern table 101. Thus, the repetitive operation is carried out at S703.

The translated word of "remunerative (利益がある)" is matched with the condition of [a case postposition+"there is (ある)"] having an ID (record number) of 5 with reference to the prefix processing pattern table shown in FIG. 13. Therefore, when the pp is 5, the processing proceeds from S703 to S704 where an operation of [substituting "there is not (ない)" for "there is (ある)"] which is the processing of ID1 in FIG. 13 is carried out on a character string of "remunerative (利益がある)". A character string of "nonremunerative (利益がない)" thus generated is stored in the translated word column of the dictionary retrieval buffer 7b as shown in FIG. 39.

As described above, it is possible to obtain a more natural translated word of a derivative having a prefix of "non" by separately translating a prefix portion depending on the translated word of a word base.

[Suffix Processing]

The derivative translation generating processing of a word of "amiableness" will be described.

Referring to this word, the processing proceeds in order of S101, S102, S103, S104, S106 and S109 in FIG. 4 by referring to the prefix table in FIG. 11 and the suffix table in FIG. 12. Thus, the processing is carried out by regarding the word of "amiableness" as a derivative having a known word of "amiable" and a suffix of "ness".

Next, the routine proceeds to a processing shown in FIG. 8 in order of S601, S602, S603, S604, S605 and S610. Thus, a processing of generating a suffix added derivative translation is started. At this time, the word base dictionary retrieval buffer 7i has the contents of storage shown in FIG. 40.

Figure 10:
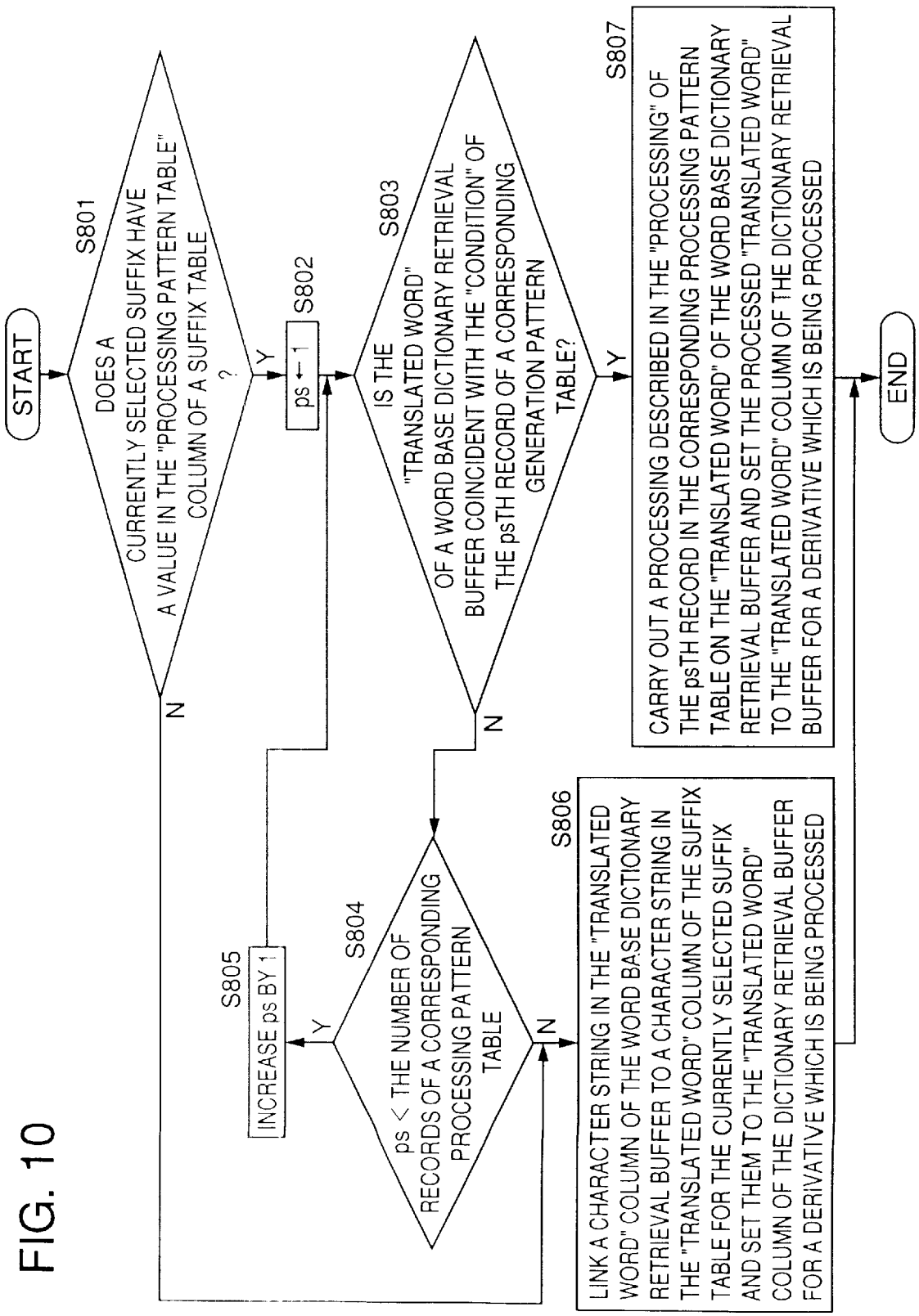
FIG. 10 is a flowchart showing the procedure for a translation processing (8) according to the present embodiment.

FIG. 10 is a flowchart showing the procedure for a translation processing (8) according to the present embodiment. Moreover, FIG. 10 shows, in detail, "the generation of a suffix added derivative translation" and "the generation of a prefix added derivative translation" at S610 in FIG. 8. In FIG. 10, it is decided whether or not the "processing pattern table" column of a suffix table has a value in relation to the currently selected suffix at S801. In this case, the selected suffix is "ness" and there is a value of "203" in the processing pattern table column of "ness" of the suffix table shown in FIG. 12. Therefore, the routine proceeds to S802.

At S802, 1 is set to a pointer variable ps of a suffix processing pattern table. At this time, a suffix processing pattern table 203 shown in FIG. 14 is selected as a suffix processing pattern table.

At S803, it is decided, on trial, whether or not the "condition" of a psth record of the suffix processing pattern table 203 is coincident with a translated word of "amiable (感じがよい)" in the translation column of the word base dictionary retrieval buffer 7i. If they are not coincident with each other, the processing proceeds in order of S803, S804, S805 and S803. The check is repeated by increasing the ps by 1 until they are coincident with each other or the ps reaches a record number in the suffix processing pattern table 203.

The translated word of "amiable (感じがよい)" is matched with a condition of ["{case postposition (が|の)}"+adjective (other than "there is not")] having an ID (record number) of 1 with reference to the processing pattern table shown in FIG. 14. Therefore, the routine proceeds from S803 to S804 when the ps is 1. An operation for the processing of ["of (の)"+the stem of adjective+"さ"] of the ID1 in FIG. 14 is carried out on a character string of "amiable". A character string of "amiableness (感じのよさ)" thus generated is stored in the translated word column of the dictionary retrieval buffer 7b as shown in FIG. 41.

Next, the derivative translation generating processing of the word of "abidingness" will be described.

Referring to this word, the routine proceeds in order of S101, S102, S103, S104, S106 and S109 in FIG. 4 by referring to the prefix table shown in FIG. 11 and the suffix table shown in FIG. 12. Thus, the processing is carried out by regarding the word of "nonremunerative" as a derivative having a known word of "abiding" and a suffix of "ness".

Next, the routine proceeds to a processing shown in FIG. 8 in order of S601, S602, S603, S604, S605 and S610. Thus, a processing of generating a suffix added derivative translation is started. At this time, a word base dictionary retrieval buffer 7i has the contents of storage shown in FIG. 42.

The routine proceeds to a processing shown in FIG. 10. In this case, the selected suffix is "ness" in the same manner as described above. Therefore, the routine proceeds in order of S801, S802 and S803. The suffix processing pattern table 203 shown in FIG. 14 is selected as a suffix processing pattern table, and it is decided whether or not a translated word of "abiding (永続的な)" in the translated word column of the word base dictionary retrieval buffer 7i is coincident with any record order of the suffix processing pattern table 203. Thus, the repetitive operation is carried out at S803.

The translated word of "permanent" is matched with the condition of ["{的な|的}"] having an ID (record number) of 3 with reference to the suffix processing pattern table shown in FIG. 14. Therefore, when the ps is 3, the processing proceeds from S803 to S804 where an operation of [substituting "{的な|的}" for "性"] which is the processing of ID3 in FIG. 14 is carried out on a character string of "abiding (永続的な)". A character string of "abidingness (永続性)" thus generated is stored in the translated word column of the dictionary retrieval buffer 7b as shown in FIG. 43.

As described above, it is possible to obtain a more natural translated word of a derivative having a suffix of "ness" by separately translating a suffix portion depending on the translated word of a word base.

According to the third embodiment, there has been constituted the derivative translation generating section for separately translating an affix portion by the translated word of a word base when generating the translated word of an unknown word in a text which has been processed as a derivative. Consequently, it is possible to generate a translated word other than a translated word obtained by simply linking the translated word of the word base to that of the affix. Thus, a more natural translated sentence can be generated as a target language.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A translator comprising:
   a word dictionary;
   an affix dictionary;
   an input section for inputting an original language to be a first language;
   a converting section for referring to the word dictionary, thereby converting the input original language into a translated word to be a second language;
   a recognizing section for referring to the word dictionary and the affix dictionary, thereby recognizing a derivative having an affix and a word base from the input original language which cannot be converted into the translated word by the converting section;
   a derivative translation generating section for linking a translated word corresponding to the affix of the recognized derivative to a translated word corresponding to the word base, thereby generating a translated word of one derivative; and
   an affix determining section for determining one affix based on an affix processing condition given from a language characteristic information when a derivative including a plurality of affixes is recognized by the recognizing section,
   wherein the derivative translation generating section generates a translated word of a derivative having the affix determined by the affix determining section and a word base corresponding thereto.

2. The translator according to claim 1, further comprising a word base determining section for determining one word base based on a verb change form information given from the language characteristic information when the recognizing section recognizes a derivative having a plurality of word bases for one affix, the derivative translation generating section generating a translated word of a derivative having a word base determined by the word base determining section and an affix corresponding thereto.

3. The translator according to claim 1, wherein the affix dictionary further includes an affix translation change information table in which an affix translation change information for changing a translated word of an affix corresponding to a part of speech of a word base and a conjugated form thereof is stored, the derivative translation generating section changing a translated word of an affix corresponding to a translated word of a word base based on the affix translation change information.

4. The translator according to claim 1, wherein the derivative translation generating section processes, as a known word, a derivative having a translated word generated once.

5. The translator according to claim 1, wherein the affix processing condition is information about a length of an affix.

6. The translator according to claim 1, wherein the affix processing condition is information about a verb change form of a word base.

7. The translator according to claim 1, wherein the affix processing condition is information about a part of speech of a word base.

8. The translator according to claim 1, wherein the affix processing condition is information about a hyphen between an affix and a word base.

9. A translating method using a word dictionary and an affix dictionary, comprising the steps of:
   inputting an original language to be a first language by means of an input section;
   referring to the word dictionary, thereby converting the input original language into a translated word to be a second language by means of a converting section;
   referring to the word dictionary and the affix dictionary, thereby recognizing, by means of a recognizing section, a derivative having an affix and a word base from the input original language which cannot be converted into the translated word by the converting section;
   linking a translated word corresponding to the affix of the recognized derivative to a translated word corresponding to the word base, thereby generating a translated word of one derivative by means of a derivative translation generating section; and
   determining, by means of an affix determining section, one affix based on an affix processing condition given from a language characteristic information when a derivative including a plurality of affixes is recognized by the recognizing section,
   wherein the derivative translation generating section generates a translated word of a derivative having the affix determined by the affix determining section and a word base corresponding thereto.

10. A storage medium to be used for a translator comprising a word dictionary, an affix dictionary and an input section for inputting an original language to be a first language in which a translation program capable of being read by a computer is stored;
    wherein the computer is caused to refer to the word dictionary, thereby converting the input original language into a translated word to be a second language, is caused to refer to the word dictionary and the affix dictionary, thereby recognizing a derivative having an affix and a word base from the input original language which cannot be converted into the translated word, is caused to link a translated word corresponding to the affix of the recognized derivative to a translated word corresponding to the word base, thereby generating a translated word of one derivative, is caused to determine one affix based on an affix processing condition given from a language characteristic information when a derivative including a plurality of affixes is recognized, and is caused to generate a translated word of a derivative having the determined affix and a word base corresponding thereto.

* * * * *